(12) United States Patent
Roberts

(10) Patent No.: US 7,172,320 B1
(45) Date of Patent: Feb. 6, 2007

(54) LOW PROFILE MODULE AND FRAME ASSEMBLY FOR ARC LAMPS

(75) Inventor: Roy D. Roberts, Hayward, CA (US)

(73) Assignee: Vaconics Lighting, Inc., Fremont, CA (US)

( * ) Notice: Subject to any disclaimer, the term of this patent is extended or adjusted under 35 U.S.C. 154(b) by 132 days.

(21) Appl. No.: 11/001,984

(22) Filed: Dec. 1, 2004

(51) Int. Cl.
*F21V 29/00* (2006.01)
*F21V 29/02* (2006.01)
*H01J 61/52* (2006.01)

(52) U.S. Cl. .................. 362/373; 362/264; 362/294

(58) Field of Classification Search ............. 362/373, 362/218, 264, 294, 45; 313/11, 40, 44
See application file for complete search history.

(56) References Cited

U.S. PATENT DOCUMENTS

| | | | |
|---|---|---|---|
| 5,561,338 A | | 10/1996 | Roberts et al. |
| 5,672,931 A | * | 9/1997 | Kiss et al. ............. 313/44 |
| 6,034,467 A | | 3/2000 | Roberts |
| RE38,006 E | * | 2/2003 | Furuhata et al. ......... 353/31 |

* cited by examiner

*Primary Examiner*—Alan Cariaso
*Assistant Examiner*—Leah S. Lovell
(74) *Attorney, Agent, or Firm*—Blakely, Sokoloff, Taylor & Zafman LLP

(57) ABSTRACT

A low profile module and frame assembly for arc lamps has been disclosed. In one embodiment, the arc lamp assembly includes an arc lamp, a first cooling fan coupled to a back of the arc lamp closer to a first side of the arc lamp, and a second cooling fan coupled laterally to the first cooling fan and to the back of the arc lamp closer to a second side of the arc lamp, the first side being opposite to the second side. Other embodiments have been described and claimed.

12 Claims, 6 Drawing Sheets

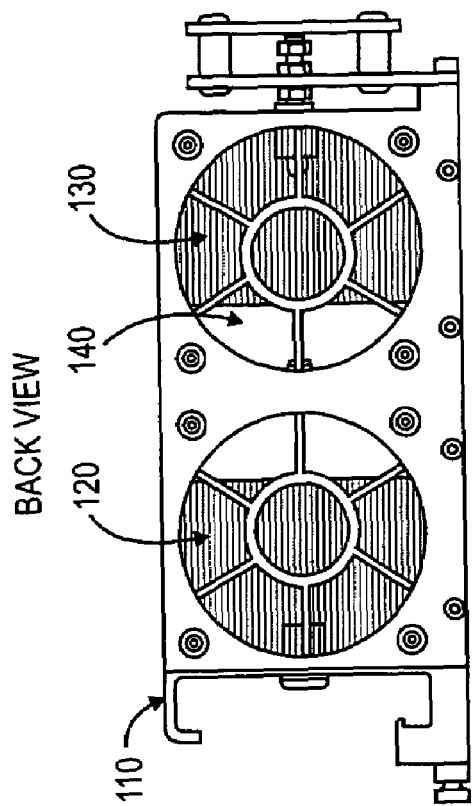
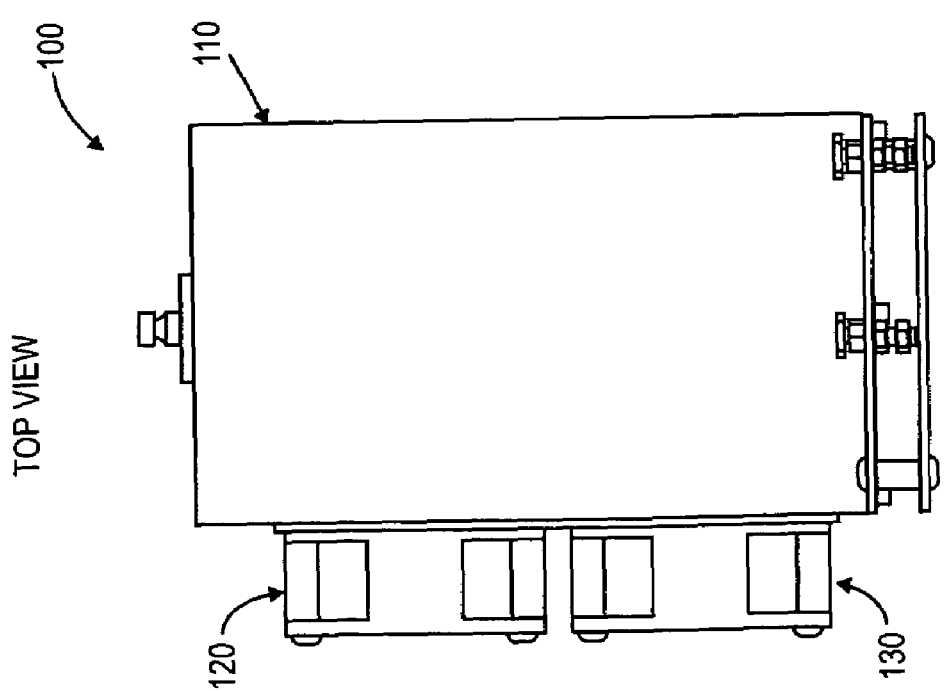

LOW PROFILE MODULE AND FRAME ASSEMBLY FOR ARC LAMPS

FIELD OF INVENTION

The present invention relates to arc lamps, and more particularly, to cooling an arc lamp.

BACKGROUND

In optical systems involving the generation and controlled radiation of long or continuous pulses of light, such as spectroscopy, or solar simulation, where high intensity, color correct illumination of sensitive working areas is required, such as in projection systems fiber optics illumination devices, it is advantageous to have a light source capable of producing the highest possible light flux density. Products utilized in such applications include short arc inert gas lamps, which may also be referred to as arc lamps. At least one conventional arc lamp includes a sealed chamber, which contains a gas pressurized to several atmospheres, and an opposed anode and cathode defining an arc gap. The conventional arc lamp further includes a window to provide for the transmission of the generated light and a reflector body surrounding the arc gap. The reflector body may be a ceramic reflector body.

During operation of the conventional arc lamp, the anode and the cathode generate a significant amount of heat. The anode and the cathode are inside the sealed chamber of the arc lamp. As a result, the reflector body is also subjected to high heat during operation of the arc lamp. Typically, heat is transferred from the sides of the arc lamp. The operating power of the arc lamp may be limited by how fast the reflector body cools off. The faster the reflector body cools off, the higher the operating power of the arc lamp may be. Furthermore, the reflector body is susceptible to cracking when operated at high temperatures over a long period of time. Cracking of the reflector body may cause the arc lamp to explode, leading to property damages and/or personal injuries.

One existing technique to cool off an arc lamp is to couple a single cooling fan to the back of the arc lamp. The cooling fan may be mounted to the back of a housing holding the arc lamp. However, the above technique is unsatisfactory because of several reasons. One reason is that the single cooling fan is usually too tall and bulky for tabletop mounting applications (e.g., in a tabletop video projection system) because a smaller fan would not be able to cool off the arc lamp to a safe temperature at an acceptable speed. Furthermore, the cooling fan is generally very noisy (e.g., having a noise level above approximately 36 dB) because of the size of the cooling fan. Thus, fan noise has frequently been an issue with arc lamp assemblies. The fan noise issue is particularly problematic for projection systems because such noise may distract the audience viewing a display by the projection system.

SUMMARY

A low profile module and frame assembly for arc lamps is described. In one embodiment, the arc lamp assembly includes an arc lamp, a first cooling fan coupled to a back of the arc lamp closer to a first side of the arc lamp, and a second cooling fan coupled laterally to the first cooling fan and to the back of the arc lamp closer to a second side of the arc lamp, the first side being opposite to the second side.

Other features of the present invention will be apparent from the accompanying drawings and from the detailed description that follows.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

FIGS. 1A–1D show one embodiment of an arc lamp assembly.

DETAILED DESCRIPTION

Figure 1D:
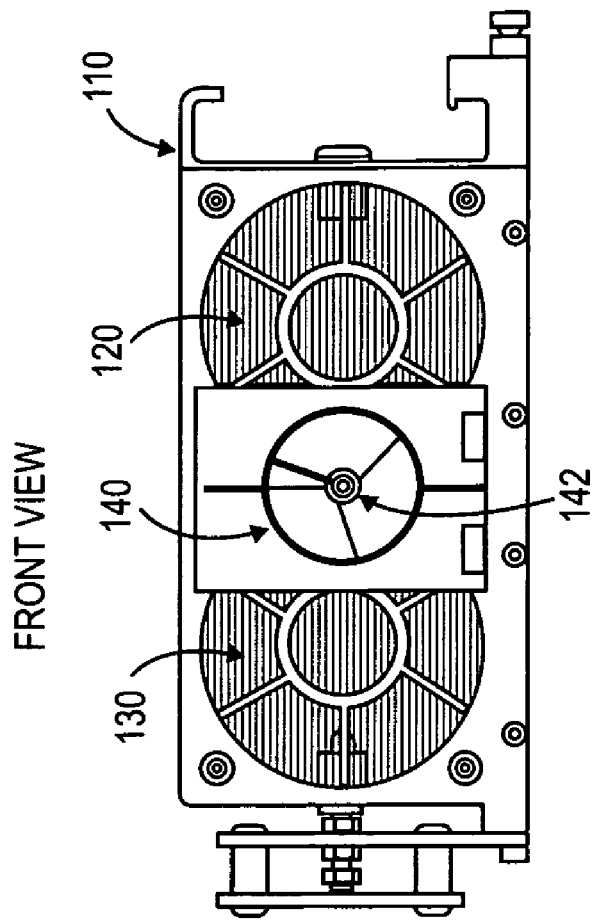

In the following description, numerous specific details are set forth. However, it is understood that embodiments of the invention may be practiced without these specific details. In other instances, well-known components, structures, and techniques have not been shown in detail in order not to obscure the understanding of this description.

FIG. 1A illustrates a top view of one embodiment of an arc lamp assembly 100. The arc lamp assembly 100 includes a frame 110, a first cooling fan 120, and a second cooling fan 130. The first and the second cooling fans 120 and 130 are mounted side by side at the back of the frame 110.

FIG. 1B illustrates a back view of the arc lamp assembly 100. The arc lamp assembly 100 further includes an arc lamp 140. As shown in FIG. 1B, the first cooling fan 120 is mounted to the back of the frame 110 and coupled to at least part of the back of the arc lamp 140. Likewise, the second cooling fan 130 is mounted to the back of the frame 110 and coupled to at least part of the back of the arc lamp 140.

Figure 1C:
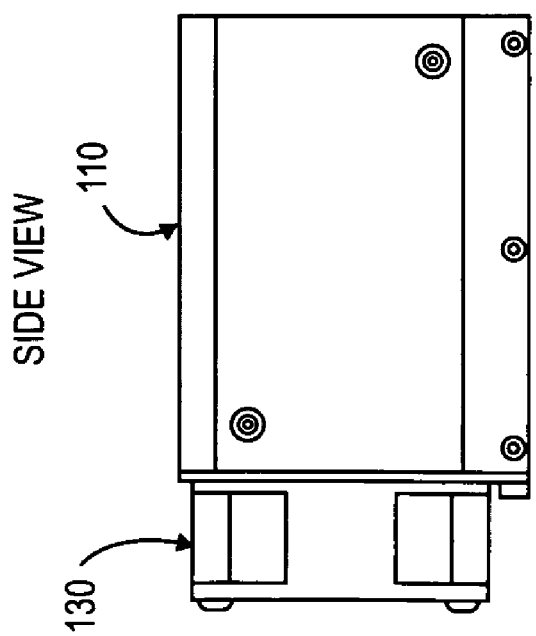

FIG. 1C illustrates a side view of the arc lamp assembly 100. The second cooling fan 130 is shown mounted to the back of the frame 110.

FIG. 1D illustrates a front view of the arc lamp assembly 100. The arc lamp 140 is mounted within the frame 110. As shown in FIG. 1D, the cathode 142 of the arc lamp 140 is mounted near the front of the arc lamp 140. By using two cooling fans 120 and 130 to cool off the arc lamp 140, the larger single cooling fan in many of the existing arc lamp assemblies can be eliminated. The smaller cooling fans 120 and 130 are shorter and less bulky, and thus, make the arc lamp assembly 100 more suitable for tabletop projection systems. For instance, the dimensions of a 500 Watt arc lamp assembly (including the arc lamp, the heat sinks, and a plastic holder) are about 2.25" in height, 5.3" in width, and 3.65" in depth according to one embodiment of the present invention. Furthermore, the dimensions of a 750_Watt arc lamp assembly (including the arc lamp, the heat sinks, and a plastic holder) are about 2.6" in height, 6.6" in width, and 3.77" in depth according to another embodiment of the present invention. In contrast, the dimensions of a typical conventional 500 Watt arc lamp assembly are about 3.7" in height, 4" in width, and 3.9" in depth, while the dimensions of a typical conventional 750 Watt arc lamp assembly are about 4" in height, 4" in width, and 4.33" in depth. Thus, there is a reduction of about 39% in the height of the 500 Watt arc lamp assembly and about 35% in the height of the 750_Watt arc lamp assembly according to some embodiments of the present invention.

Furthermore, the smaller cooling fans 120 and 130 have a lower combined noise level (e.g., less than approximately 36 dB) than the larger cooling fan in the existing arc lamp assemblies. Hence, the system incorporating the arc lamp assembly 100 is quieter than those incorporating the existing arc lamp assemblies. Lower noise level is advantageous for projection systems because quieter projection systems are less distracting for the audience viewing the display by the projection systems.

Figure 2:
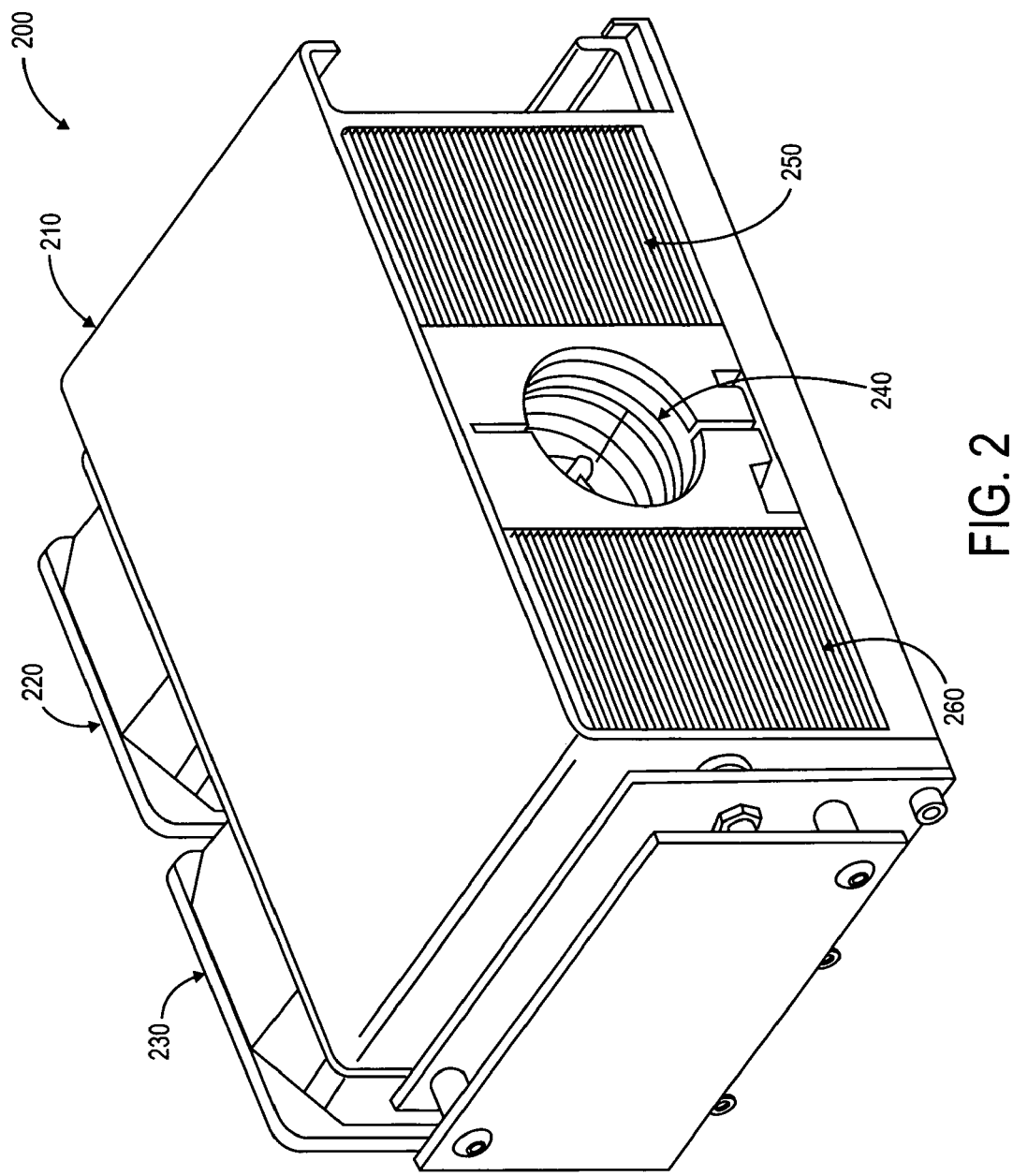
FIG. 2 shows one embodiment of an arc lamp assembly.

FIG. 2 shows one embodiment of an arc lamp assembly 200. The arc lamp assembly 200 includes a frame 210, two cooling fans 220 and 230, two heat sinks 250 and 260, and an arc lamp 240. The two cooling fans 220 and 230 are mounted side by side to each other on the back of the frame 210. The first cooling fan 220 is coupled to the back of the arc lamp 240 closer to a first side of the arc lamp 240. The second cooling fan 230 is coupled to the back of the arc lamp 240 closer to a second side of the arc lamp 240. The two sides of the arc lamp 240 are opposite to each other.

In one embodiment, the first heat sink 250 is coupled laterally to the first side of the arc lamp 240 while the second heat sink 260 is coupled laterally to the second side of the arc lamp 240. Since heat generated during operation of the arc lamp 240 is typically transferred from the sides of the arc lamp 240, the heat sinks 250 and 260 on the sides of the arc lamp 240 may effectively cool off the arc lamp 240. Furthermore, the cooling fans 220 and 230 cause air to circulate more efficiently through the heat sinks 250 and 260, respectively, and hence, help to cool off the arc lamp 240 faster.

By mounting the heat sinks 250 and 260 laterally to the arc lamp 240, the height of the arc lamp assembly 200 is made smaller than many traditional arc lamp assemblies. Therefore, the arc lamp assembly 200 is more suitable for applications in systems that are limited in size, such as tabletop projection systems.

Figure 3B:
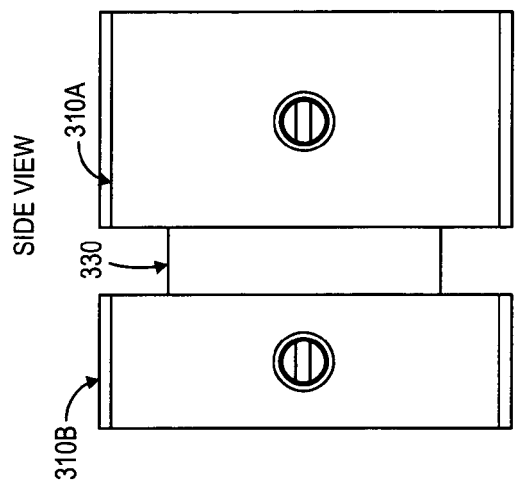
FIGS. 3A–3C show one embodiment of an arc lamp assembly.
Figure 3A:
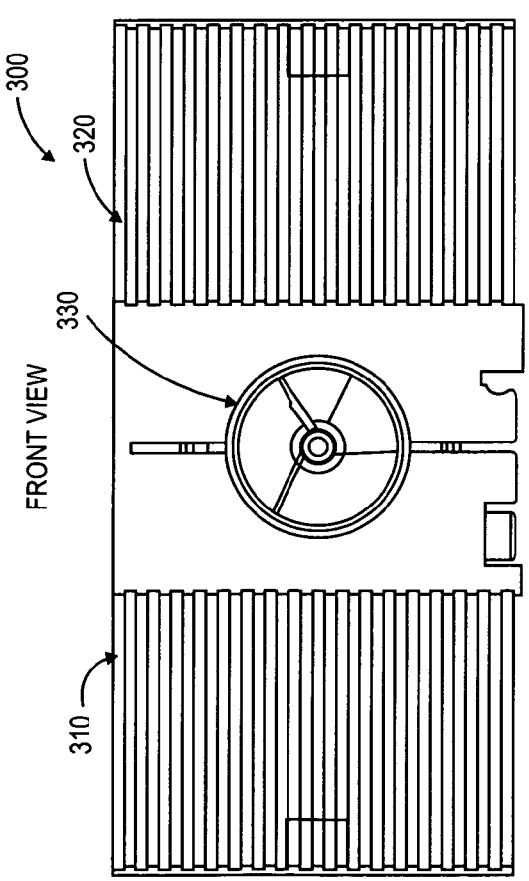

FIG. 3A illustrates a front view of one embodiment of an arc lamp assembly. The arc lamp assembly 300 includes a first heat sink 310, a second heat sink 320, and an arc lamp 330. The first heat sink 310 is coupled laterally to the arc lamp 330 on the left side in FIG. 3A. Likewise, the second heat sink 320 is coupled laterally to the arc lamp 330 on the right side in FIG. 3A.

FIG. 3B shows a side view of the arc lamp assembly 300. In one embodiment, the first heat sink 310 includes two pieces 310A and 310B. The piece 310A may be coupled closer to the anode of the arc lamp 330 while the piece 310B may be coupled closer to the cathode of the arc lamp 330. Although only the left side view is shown in FIG. 3B, it is apparent to one of ordinary skill in the art that the right side of the arc lamp assembly is substantially the same.

Figure 3C:
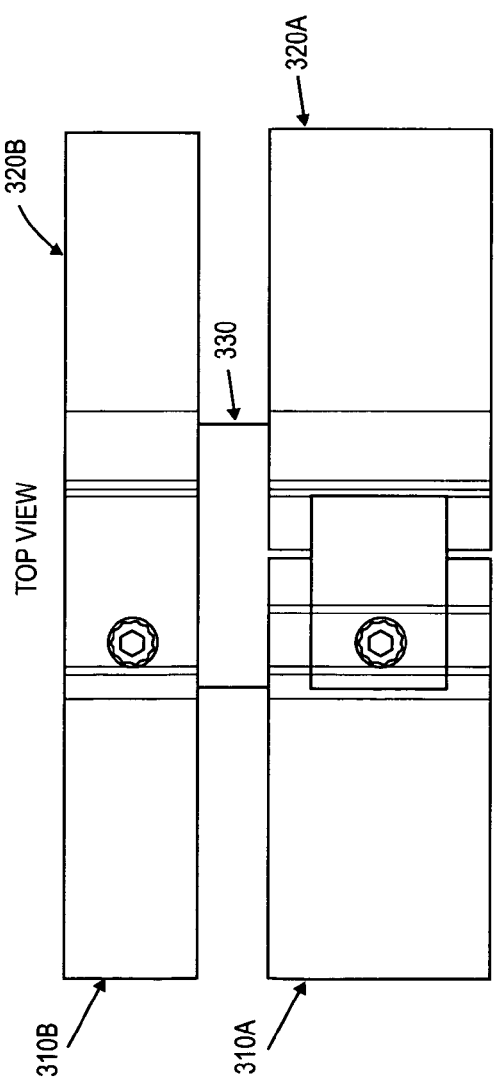

FIG. 3C shows a top view of the arc lamp assembly 300. In one embodiment, the second heat sink 320 includes two pieces 320A and 320B. The piece 320A may be coupled closer to the anode of the arc lamp 330 while the piece 320B may be coupled closer to the cathode of the arc lamp 330.

Figure 4:
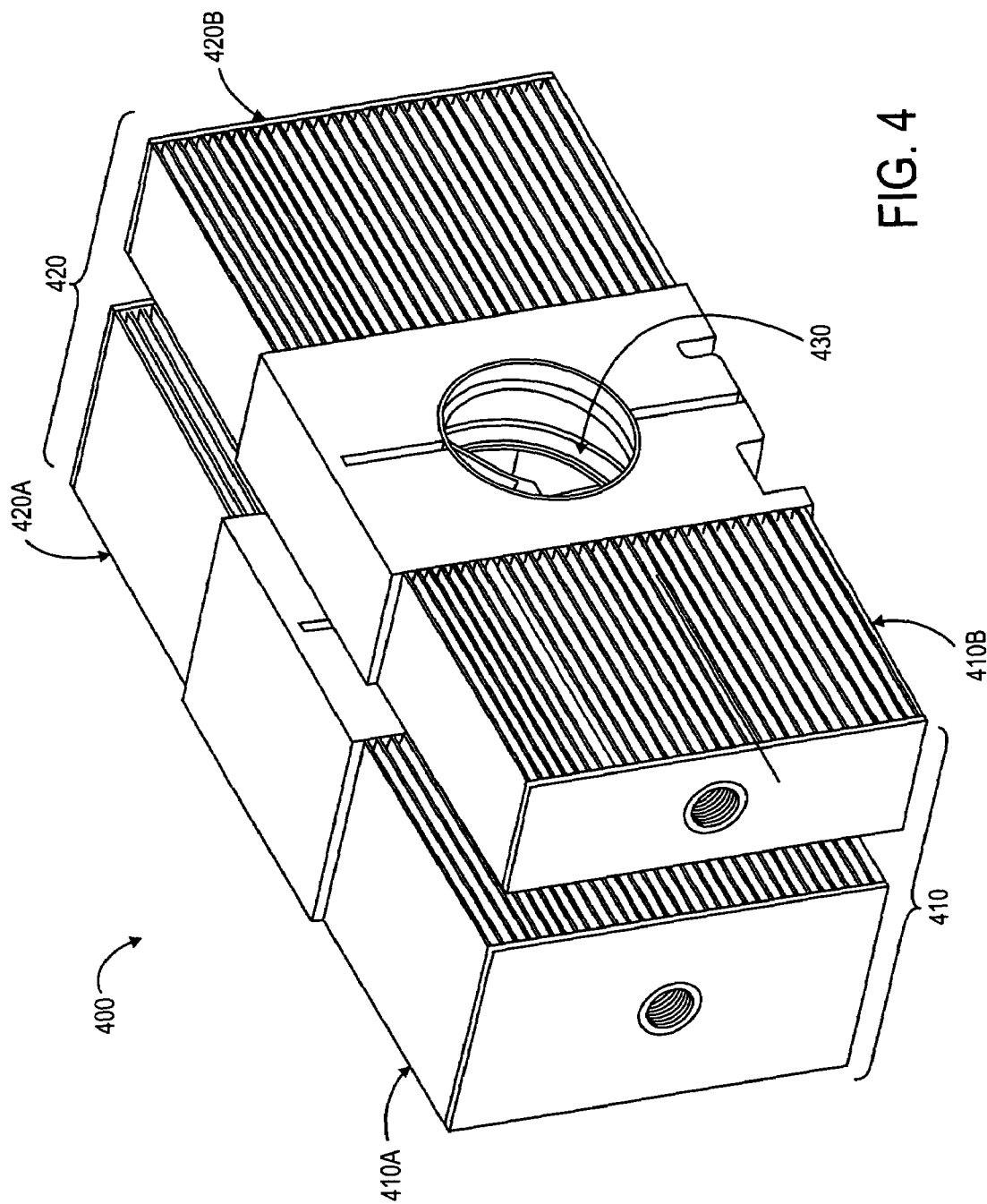
FIG. 4 shows one embodiment of an arc lamp assembly.

FIG. 4 shows one embodiment of an arc lamp assembly. The arc lamp assembly 400 includes two heat sinks 410 and 420 and an arc lamp 430. The heat sink 410 is coupled laterally to the left side of the arc lamp 430 and the heat sink 420 is coupled laterally to the right side of the arc lamp 430. In one embodiment, the heat sink 410 includes two pieces 410A and 410B. Likewise, the heat sink 420 may include two pieces 420A and 420B. Both pieces 410B and 420B may be coupled closer to the anode of the arc lamp 430 while the other two pieces 410A and 420A may be coupled closer to the cathode of the arc lamp 430. Since heat generated during operation of the arc lamp 430 is typically transferred from the side of the arc lamp 430, the heat sinks 410 and 420 can effectively lower the temperature of the arc lamp 430. Furthermore, by coupling two heat sinks 410 and 420 to the sides of the arc lamp 430 instead of a single heat sink as in some conventional designs, the heat sinks 410 and 420 may each be smaller than the single heat sink. The resultant arc lamp assembly 400 may be shorter and less bulky than the conventional design. Thus, the arc lamp assembly 400 is more suitable for application in smaller systems, such as a tabletop projection system.

Figure 5:
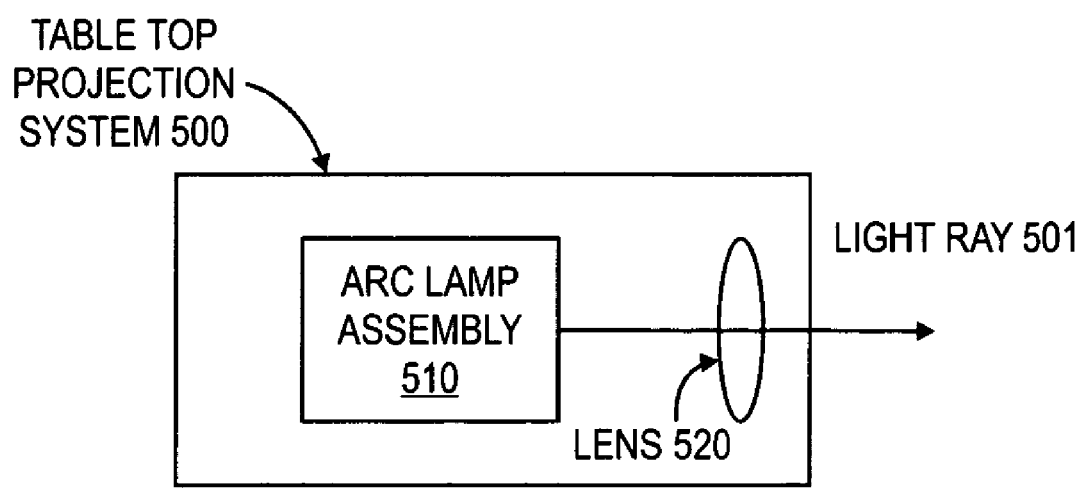
FIG. 5 shows one embodiment of a table top projection system

FIG. 5 illustrates one embodiment of a tabletop projection system. The tabletop projection system 500 includes an arc lamp assembly 510 and a lens 520. The arc lamp assembly 510 is optically coupled to the lens 520. During operation, the arc lamp assembly 510 may generate a light ray 501, which passes through the lens 520 to project onto a surface, such as a screen, a board, a wall, etc. Some embodiments of the arc lamp assembly 510 have been described above.

Note that the tabletop projection system 500 is described above as one example of the application of the improved arc lamp assembly. One of ordinary skill in the art would readily recognize other similar applications of the improved arc lamp based on the current disclosure.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. An arc lamp assembly comprising:
   an arc lamp;
   a first cooling fan coupled to a back of the arc lamp closer to a first side of the arc lamp;
   a second cooling fan coupled laterally to the first cooling fan and to the back of the arc lamp closer to a second side of the arc lamp, the first side being opposite to the second side;
   a first heat sink coupled laterally to the first side of the arc lamp; and
   a second heat sink coupled laterally to the second side of the arc lamp.

2. The arc lamp assembly of claim 1, further comprising:
   a frame enclosing the arc lamp and the first and second heat sinks.

3. An arc lamp assembly comprising:
   an arc lamp;
   a first cooling fan coupled to a back of the arc lamp closer to a first side of the arc lamp; and
   a second cooling fan coupled laterally to the first cooling fan and to the back of the arc lamp closer to a second side of the arc lamp, the first side being opposite to the second side, wherein the combined noise level of the first and second cooling fans is below approximately 36 dB.

4. The arc lamp assembly of claim 3, further comprising:
   a first heat sink coupled laterally to the first side of the arc lamp; and
   a second heat sink coupled laterally to the second side of the arc lamp.

5. The arc lamp assembly of claim 4, further comprising a frame enclosing the first heat sink, the second heat sink, and the arc lamp.

6. A method to make an arc lamp assembly, the method comprising:

coupling a first cooling fan to a back of an arc lamp closer to a first side of the arc lamp;
coupling a second cooling fan laterally to the first cooling fan and to the back of the arc lamp closer to a second side of the arc lamp, the first side being opposite to the second side;
coupling a first heat sink laterally to the first side of the arc lamp; and
coupling a second heat sink laterally to the second side of the arc lamp.

7. The method of claim 6, further comprising:
mounting the arc lamp and the first and second heat sinks within a frame; and
mounting the first and the second cooling fans side by side at a back of the frame.

8. A method to make an arc lamp assembly, the method comprising:
coupling a first cooling fan to a back of an arc lamp closer to a first side of the arc lamp; and
coupling a second cooling fan laterally to the first cooling fan and to the back of the arc lamp closer to a second side of the arc lamp, the first side being opposite to the second side, wherein the combined noise level of the first and the second cooling fans is below approximately 36 dB.

9. A table top projection system comprising:
a lens; and
an arc lamp assembly optically coupled to the lens, the arc lamp assembly comprising
an arc lamp;
a first cooling fan coupled to a back of the arc lamp closer to a first side of the arc lamp; and
a second cooling fan coupled laterally to the first cooling fan and to the back of the arc lamp closer to a second side of the arc lamp, the first side being opposite to the second side.

10. The table top projection system of claim 9, wherein the arc lamp assembly further comprises:
a first heat sink coupled laterally to the first side of the arc lamp; and
a second heat sink coupled laterally to the second side of the arc lamp.

11. The table top projection system of claim 10, wherein the arc lamp assembly further comprises:
a frame enclosing the arc lamp and the first and second heat sinks.

12. The table top projection system of claim 9, wherein the combined noise level of the first and second cooling fans is below approximately 36 dB.

* * * * *